United States Patent
Cheshire

(10) Patent No.: US 7,080,132 B2
(45) Date of Patent: Jul. 18, 2006

(54) PRESENTATION DURING NETWORK ADDRESS ACQUISITION

(75) Inventor: Stuart Cheshire, San Jose, CA (US)

(73) Assignee: Apple Computer, Inc., Cupertino, CA (US)

( * ) Notice: Subject to any disclaimer, the term of this patent is extended or adjusted under 35 U.S.C. 154(b) by 726 days.

(21) Appl. No.: 09/765,835

(22) Filed: Jan. 19, 2001

(65) Prior Publication Data
US 2002/0099803 A1 Jul. 25, 2002

(51) Int. Cl.
*G06F 15/177* (2006.01)
(52) U.S. Cl. .............. 709/220; 709/223; 709/226; 709/229; 717/121; 717/122; 717/168; 717/174
(58) Field of Classification Search ........ 709/220–223, 709/226, 229; 717/121, 122, 168, 174
See application file for complete search history.

(56) References Cited

U.S. PATENT DOCUMENTS

| | | | |
|---|---|---|---|
| 6,219,698 B1* | 4/2001 | Iannucci et al. ............ 709/221 |
| 6,442,529 B1* | 8/2002 | Krishan et al. ................ 705/14 |
| 6,611,915 B1* | 8/2003 | Kubik et al. ................. 713/200 |
| 6,697,851 B1* | 2/2004 | Althaus et al. ............. 709/220 |
| 6,732,181 B1* | 5/2004 | Lim et al. .................... 709/229 |
| 2001/0042107 A1 | 11/2001 | Palm | |
| 2003/0083931 A1* | 5/2003 | Lang ........................... 705/14 |
| 2004/0249927 A1* | 12/2004 | Pezutti ....................... 709/223 |

FOREIGN PATENT DOCUMENTS

GB 2353434 A 2/2001

OTHER PUBLICATIONS

S. Drach, Jan. 1999, 'DHCP Option for the Open Group's User Authentication Protocol,' Network Working Group, "RFC 2485," p. 2.*
R. Droms, Oct. 1993, 'Dynamic Host Configuraiton Protocol,' Network Working Group, "RFC 1531," abstract.*
Eric A. Hall, "Unleashing the Power of DHCP," *Network Computing*, Document No. XP-002211371, Jul. 10, 2000 (2 pages).
S. Alexander and R. Droms, "RFC2132: DHCP Options and BOOTP Vendor Extensions," *Network Working Group*, Internet RFC/STD/FYI/BCP Archives, Document No. XP-220011372, Mar. 30, 1997 (24 pages).

(Continued)

*Primary Examiner*—Kim Huynh
*Assistant Examiner*—Niketa Patel
(74) *Attorney, Agent, or Firm*—Blakely, Sokoloff, Taylor & Zafman LLP

(57) ABSTRACT

A method and apparatus for instructing a processing system to present information. In one embodiment of the invention a server processing system on a network uses the DHCP protocol to provide network configuration information for a client processing system. The server processing system uses DHCP option code 56 to include presentation information with the configuration information sent to the client. Option code 56 allows for text messages to be presented by the client processing system and also allows URL-formatted text that may cause web pages or other internet resources to be presented by the client processing system. Because the presentation information is included with the network configuration information, information is presented when the client processing system uses the configuration information (e.g., upon network initialization).

39 Claims, 7 Drawing Sheets

OTHER PUBLICATIONS

PCT International Search Report for PCT Int'l Appln No. US02/02416, mailed Sep. 19, 2002 (7 pages).

W. Simpson (Editor), *The Point-to-Point Protocol (PPP)*, Request for Comments: 1661 (RFC1661), Jul. 1994.

S. Alexander, *DHCP Options and BOOTP Vendor Extensions*, Request for Comments: 2132 (RFC2132), Mar. 1997.

G. McGregor, The PPP Internet Protocol Control Protocol (IPCP), Request for Comments: 1332 (RFC1332), May 1992.

* cited by examiner

DHCP PACKET FORMAT

PRESENTATION DURING NETWORK ADDRESS ACQUISITION

FIELD OF THE INVENTION

The present invention relates generally to network communications, and more particularly to a method for presenting information to a user upon the user's initial connection to the network.

BACKGROUND

Over the past decade access to the Internet has become more and more important. For many, the Internet is now indispensable for business and personal communication, education, commerce, entertainment, recreation, and other uses. Today, many commercial establishments provide their patrons access to the Internet. This access may be through a wired Internet access port that users plug their computers into or may be through a wireless system. Due to recent advances in Internet access technology, the day is rapidly approaching when every public facility, every coffeehouse, mall, or airport, will provide access to the Internet, much as they currently provide chairs for patrons to sit on, electric lighting to see by, and heating for the patron's comfort.

Commercial establishments that provide Internet access may wish to present a user with information related to their product at the time the user accesses the Internet. If a commercial establishment is providing Internet access for free, they may wish to notify their patrons of this generosity. If they wish to charge for providing access, they may wish to provide the user with payment terms. The user might then be asked to accept the payment terms and perhaps provide payment information before access to the Internet would be granted.

One method used by some hotels, and other Internet access providers, to ensure that such information is provided to the user and to ensure the user accepts the payment conditions, is to wait for the user to attempt to access a web page, and then "hijack" that connection and display a different page, of the provider's choosing, instead.

FIG. 1 is a process flow diagram depicting how this is done. Process 100 shown in FIG. 1 begins at operation 105 in which a user connects to the Internet. This may be accomplished by plugging a computer into a wired Internet connection port such as an Ethernet jack, or without wires by accessing a wireless network gateway such as an IEEE 802.11 wireless access point.

At operation 110 the user runs their web browser and attempts to access a World Wide Web (web) address (e.g., http://www.uspto.gov). That the user will run a web browser is an assumption that providers make based upon their presumption that anyone who accesses the Internet wishes to access the World Wide Web (web).

At operation 115 the access provider intercepts the user's request for a specific web page and gives the user the wrong page (e.g., the provider's sign-on page). The system basically shunts the user from the address they requested, to a display of the provider's choosing. At operation 120 the user receives the information directed by the access provider and acts upon it if necessary. Only now is the user provided Internet access. At operation 125 the user must now reenter their request for a specific web address.

This method is problematic for both the provider and the user for several reasons. First, not everyone who accesses the Internet uses a web browser or accesses the web. Though the web is popular, there are many other reasons to access the Internet (e.g., e-mail, filesharing, encrypted telnet). Therefore, a system that relies on the user's accessing the web will miss the opportunity to contact and charge many users who have no need to use a web browser.

Second, this type of hijacking of the user's connection violates the end-to-end principle. The end-to-end principle is a fundamental concept of network development with the purpose of ensuring the reliability and integrity of the developing Internet. Basically stated, the principle holds that the job of any reliable network infrastructure is simply to deliver network packets to the destination address specified in the packet header, not to look inside the packets, try to understand what the contents mean, alter the contents, deliberately divert packets to a different destination, or to forge reply packets that purport to originate from the intended destination. Though in this case a user will be quite aware that they have been shunted to a billing information and authorization page, every time the end-to-end principle is ignored the reliability and flexibility of the Internet is diminished.

Third, this method involves the added and frustrating burden of attempting to access information only to be shunted to a billing page after which you must reaccess the desired information.

SUMMARY

A method is described for instructing a processing system to present information. A request for network configuration information from a client processing system is received by a server processing system. Configuration information is sent from the server processing system to the client processing system. Included with the configuration information is presentation information. Information is presented when the client processing system uses the configuration information.

Other features and advantages of the present invention will be apparent form the accompanying drawings, and from the detailed description, which follows below.

BRIEF DESCRIPTION OF THE DRAWINGS

The present invention is illustrated by way of example and not limited by the figures of the accompanying drawings in which like references indicate similar elements and in which.

DETAILED DESCRIPTION

The present invention provides, in one embodiment, methods and apparatuses for instructing a computer on a network to automatically present information or access other network resources upon initialization of the computer's network interface. As recognized by an embodiment of the present invention it is possible to include presentation information with the network configuration information (configuration protocol packet) provided to a client accessing the network. The network configuration protocol packet may include text information or uniform resource locator (URL) information together with the information necessary for network configuration.

An intended advantage of one embodiment of the present invention is to cause a client processing system on a network to automatically present information upon network initialization. For example a network operator may desire to have a message presented to users of the network. For commercial establishments this could include specific advertising or other commercially relevant information. Another intended advantage is to direct a client processing system on a network to a particular web address or other network resource upon network initialization. Another intended advantage is to direct a client processing system on a network to a particular volume on a file server upon network initialization.

Figure 1:
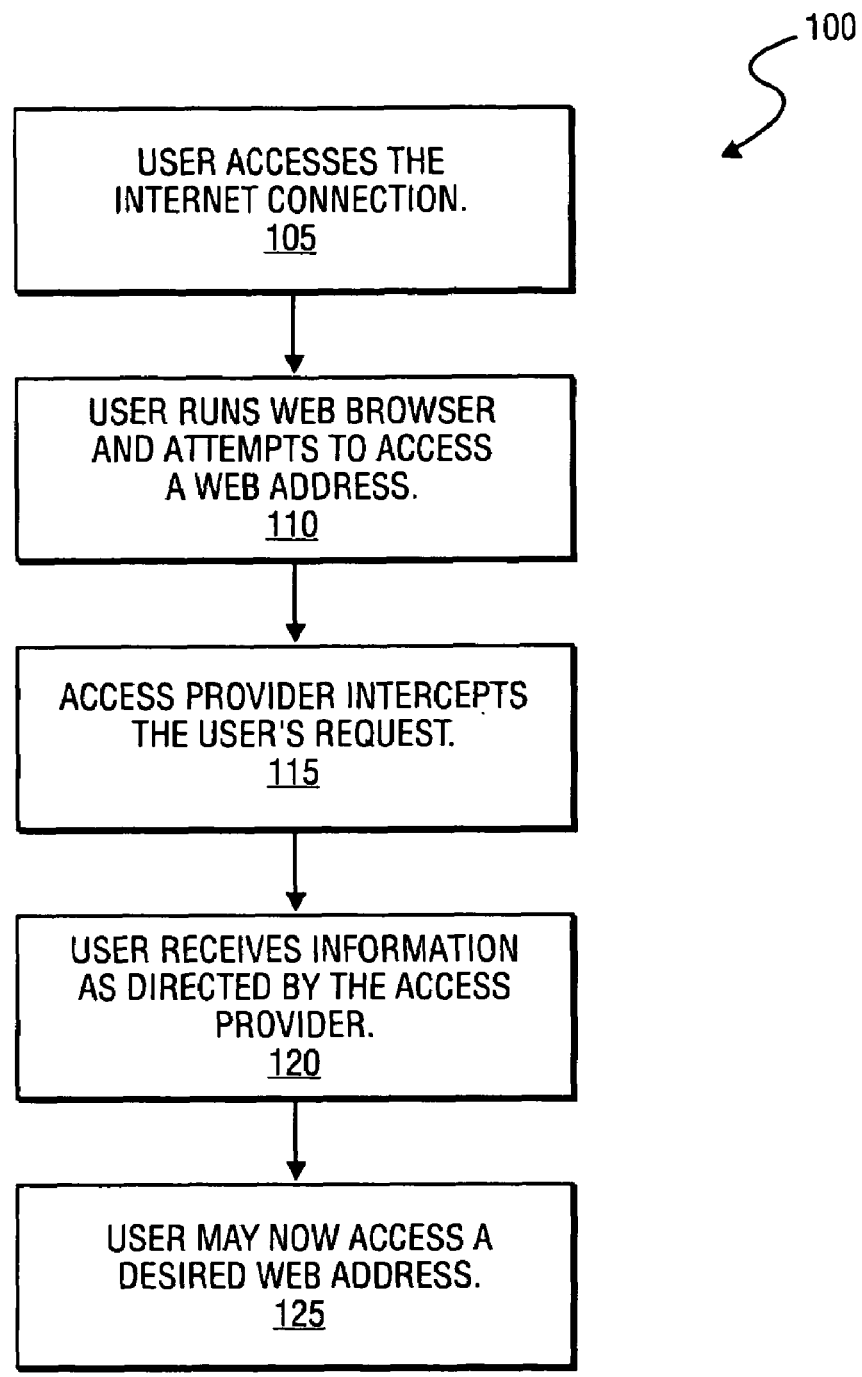
FIG. 1 is a prior art process flow diagram depicting the presentation of information.
Figure 2:
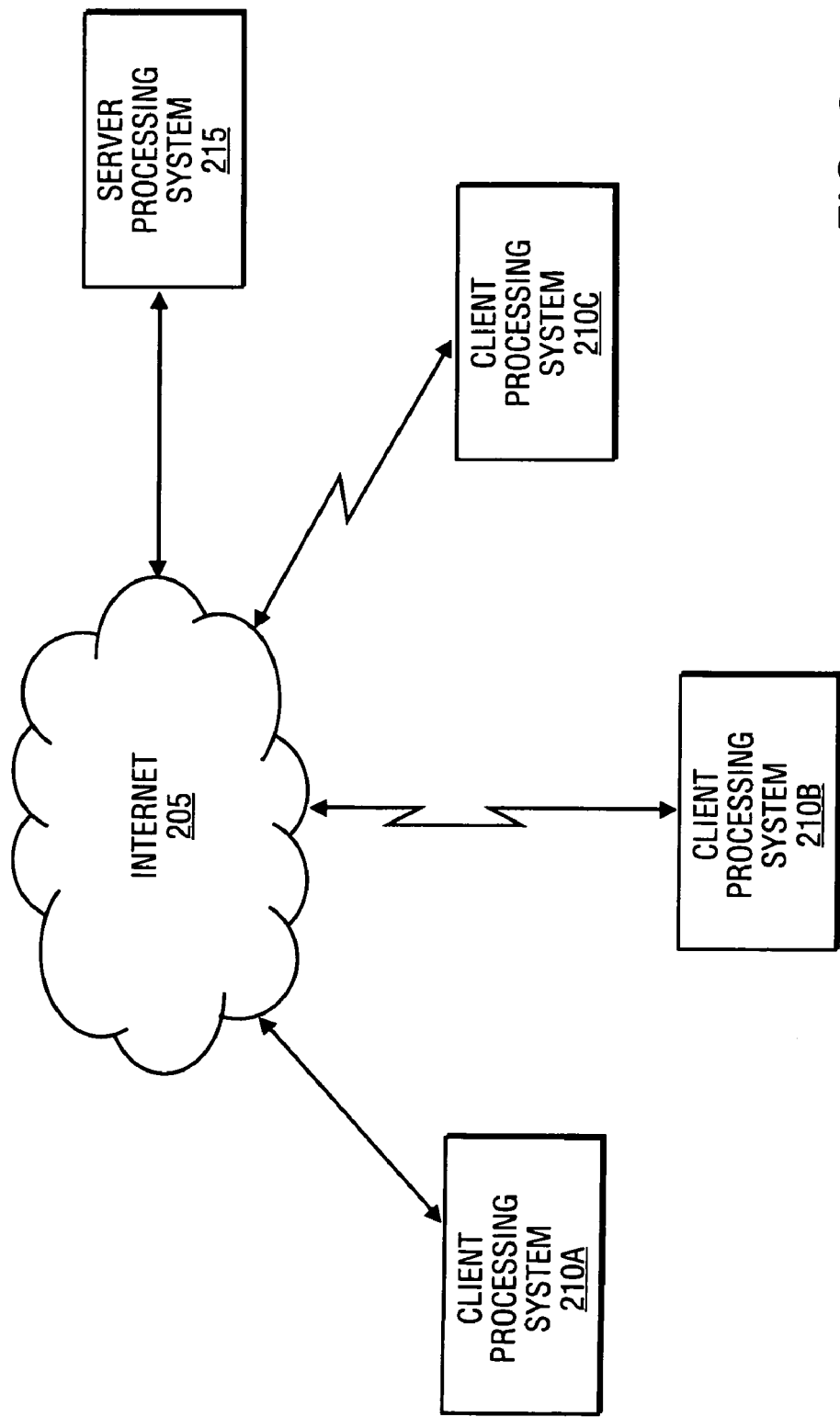
FIG. 2 is an overview of a network of processing systems in accordance with one embodiment of the present invention.

FIG. 2 provides an overview of a network of processing systems 200 in which client processing systems may be caused to present information according to one embodiment of the present invention, but it is appreciated that the applicable environments are not limited to what is shown in FIG. 2. As shown in FIG. 2, a number of local or remote client processing systems 210a, 210b, and 210c, are coupled, through internet 205, to a server processing system 215. The client processing systems 210a, 210b, and 210c may be coupled through a wired or wireless connection.

The internet 210 is a network of networks through which information is exchanged which uses protocols such as the TCP/IP protocol, and other protocols such as the hypertext transfer protocol (HTTP) for hypertext markup language (HTML) documents that make up the World Wide Web. The physical connections of the Internet and the protocols and communication procedures of the Internet are well known to those of skill in the art.

The client processing systems 210a, 210b, and 210c are coupled to server processing system 215 in order to obtain the network configuration information needed to access internet 205. In modern networks this information is typically obtained from a server processing system (e.g., server processing system 215). The network user need no longer be directly involved in this process.

The client processing system uses the network configuration information to configure itself. Network configuration information typically contains an internet protocol (IP) address which is a globally unique address of a host connected to the internet. The IP address is used to initialize the client processing system's network interface. The configuration information also typically contains subnet masks to identify and distinguish the network portion of an IP address from the host part, and domain name system (DNS) addresses that are used to resolve domain names to IP addresses and vice versa.

In one embodiment, configuration information is provided by the server processing system to the client processing system through use of the dynamic host configuration protocol (DHCP). Other protocols could be used in accordance with the present invention (e.g., point-to-point protocol (PPP)).

Using the DHCP the client processing system initiates an exchange of messages between itself and the server processing system.

Figure 3:
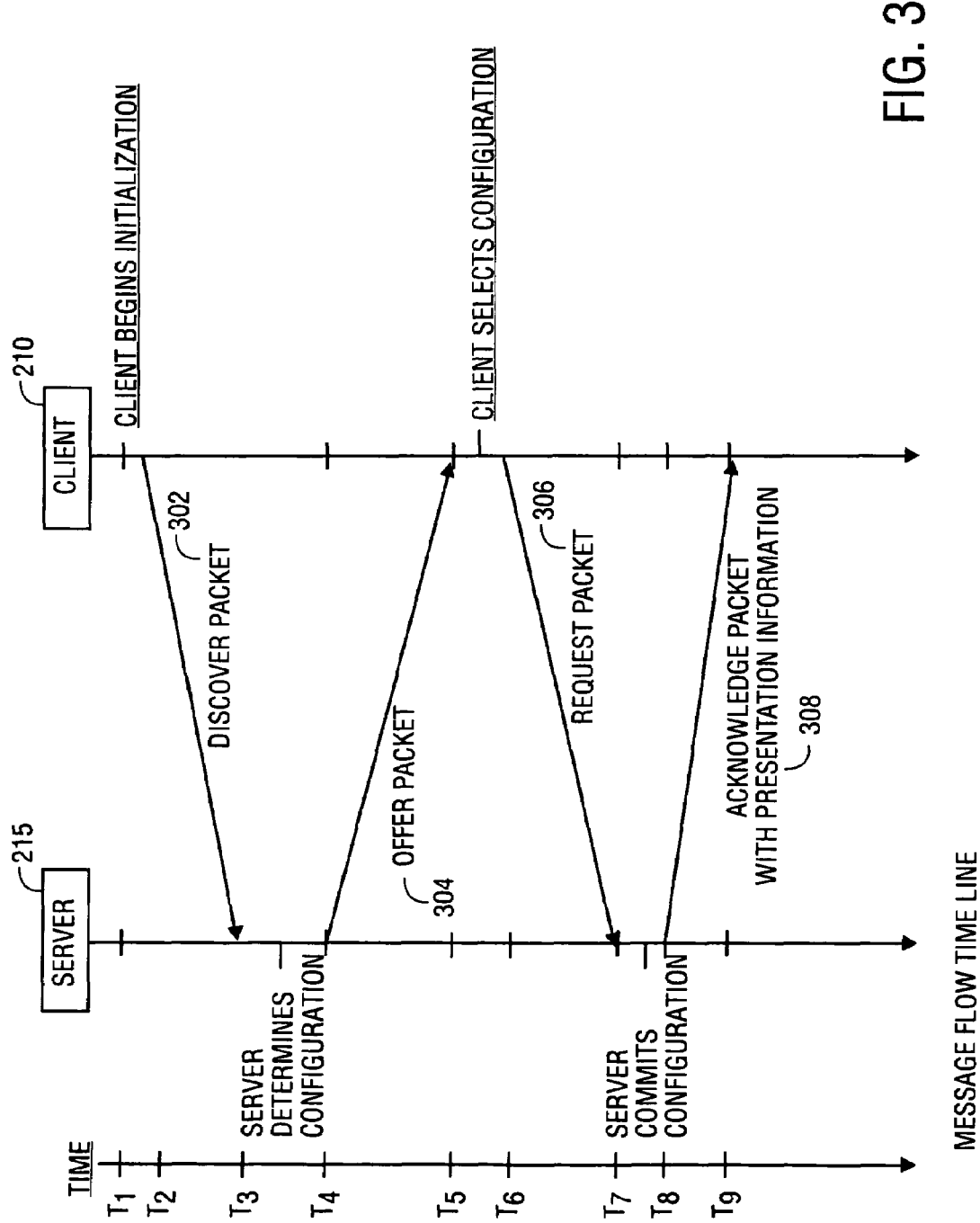
FIG. 3 is a message flow timeline depicting the exchange of DHCP messages.

FIG. 3 is a message flow timeline depicting the exchange of DHCP messages. As shown in FIG. 3 the client processing system 210 begins initialization at time $T_1$, to obtain a lease on an IP address. The client processing system 210 assembles the information the server processing system 215 needs to fulfill the request. The client processing system 210 puts this information in a DISCOVER packet 302. At time $T_2$ the client processing system 210 sends the DISCOVER packet 302 to the server processing system 215. The DISCOVER packet 302 may be sent to more than one server processing system at this time. The DISCOVER packet 302 is basically requesting configuration information. At time $T_3$ the server processing system 215 receives the DISCOVER packet 302 and determines the configuration. The server processing system 215 determines if an address is available to offer the client processing system 210. If so, the server processing system 215 offers that address to the client processing system 210 by sending the client processing system 210 an OFFER packet 304 as shown in FIG. 3 at time $T_4$. The OFFER packet 304 contains an IP address for use by the client processing system 210 for a period of time, known as a lease, together with the other parameters the client processing system 210 needs to operate. If a server processing system 215 does not have an address it merely declines to respond to the client processing system DISCOVER packet 302 and perhaps a server processing system with an address to offer responds. The client processing system 210 receives the OFFER packet 304 at time $T_5$ and may receive OFFERS from other server processing systems. If multiple OFFERS are received the client processing system 210 could compare OFFERS. In practice the client processing system 210 accepts the first OFFER received. Having selected an OFFER, the client processing system 210 builds a REQUEST packet 306 and sends it to the server processing system 215 at time $T_6$. The client processing system 210 uses the REQUEST packet 306 to claim the offered address. Typically the REQUEST packet 306 is broadcast so all server processing systems involved are aware of which offer the client processing system 210 has selected. Further OFFERS are discarded.

At time $T_7$ the server processing system 215 receives the REQUEST packet 306. At time $T_8$, the server processing system 215 then commits the offered lease to the client processing system and sends an ACKNOWLEDGE packet 308 to inform the client processing system 210 of the address. At time $T_9$ the client processing system 210 is aware that it has a valid lease on the IP address and can use the information. In one embodiment of the present invention the presentation information is added to the ACKNOWLEDGE packet 308 as described below. This additional information allows the server processing system 215 to cause information to be presented at the client processing system 210 at the time of network initialization.

Figure 4A:
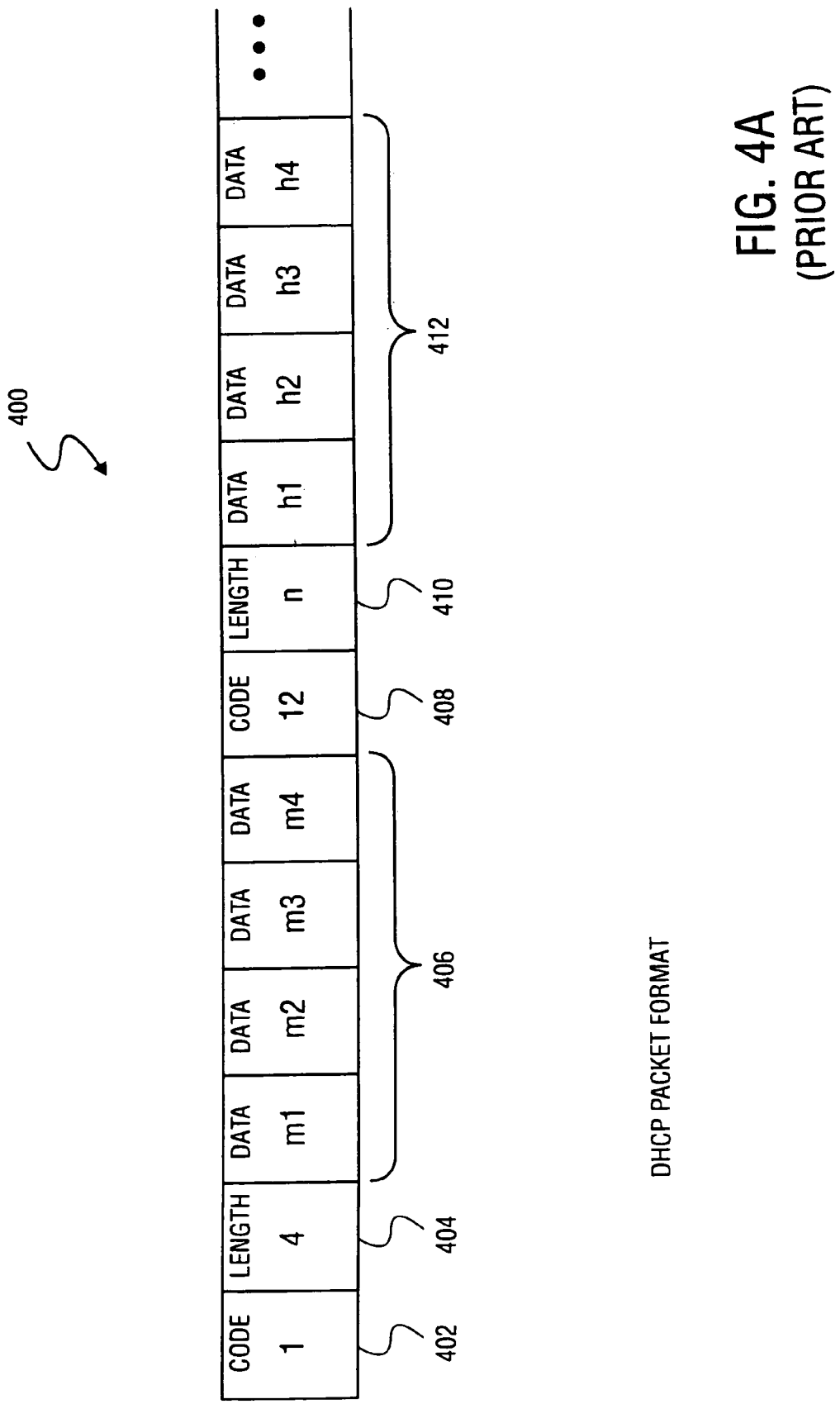
FIG. 4A is a DHCP data packet of the prior art.

The configuration information is exchanged in packets as discussed above. The format of the DHCP is known as a key-value pair format and is extensible. Within each block of data there is a sequence of sub-blocks as shown in FIG. 4A. The packet 400, shown in FIG. 4A, is a variable length stream of bytes. Byte 402 is an option code byte. The option codes are defined in the Internet Engineering Task Force Request for Comments 2132 (IETF RFC 2132). In packet 400, for example, option code byte 402 is coded 1. According to IETF RFC 2132, option code 1 is the subnet mask option that specifies the client processing system's subnet mask. Byte 402 is a length byte with a value of 4. That means the subnet mask will be designated with the next 4 bytes 406. The code byte, length byte, and data bytes corresponding to the value of the length byte, together, form a data block. Any practical number of data blocks can be linked together. As shown in packet 400 of FIG. 4A, for example, a new block begins at byte 408 which is a code byte having a value of 12. The length byte has a user-designated value of n. The following n bytes 412 contain the information specified by code 12 which, according to IETF RFC 2132 is the host name option used to specify the name of the client processing system.

This coding system allows a processing system that is unfamiliar with a given code to simply ignore the designated data and continue with the operations that it does understand. Therefore it is possible for a processing system to read the packet format even if it doesn't understand everything that's in the packet. This allows new commands to be added without the need to upgrade the totality of user software. Systems can just ignore what they don't understand.

The DHCP has an option code designated for sending error messages. According to IETF RFC 2132, option code 56 can be used by the server processing system to provide an error message to a negative ACKNOWLEDGE message in the event of a failure. Option code 56 can also be used by a client processing system in a DECLINE message to indicate why the client processing system has declined a configuration offer. Option code 56 carries a variable length text message.

Figure 4B:
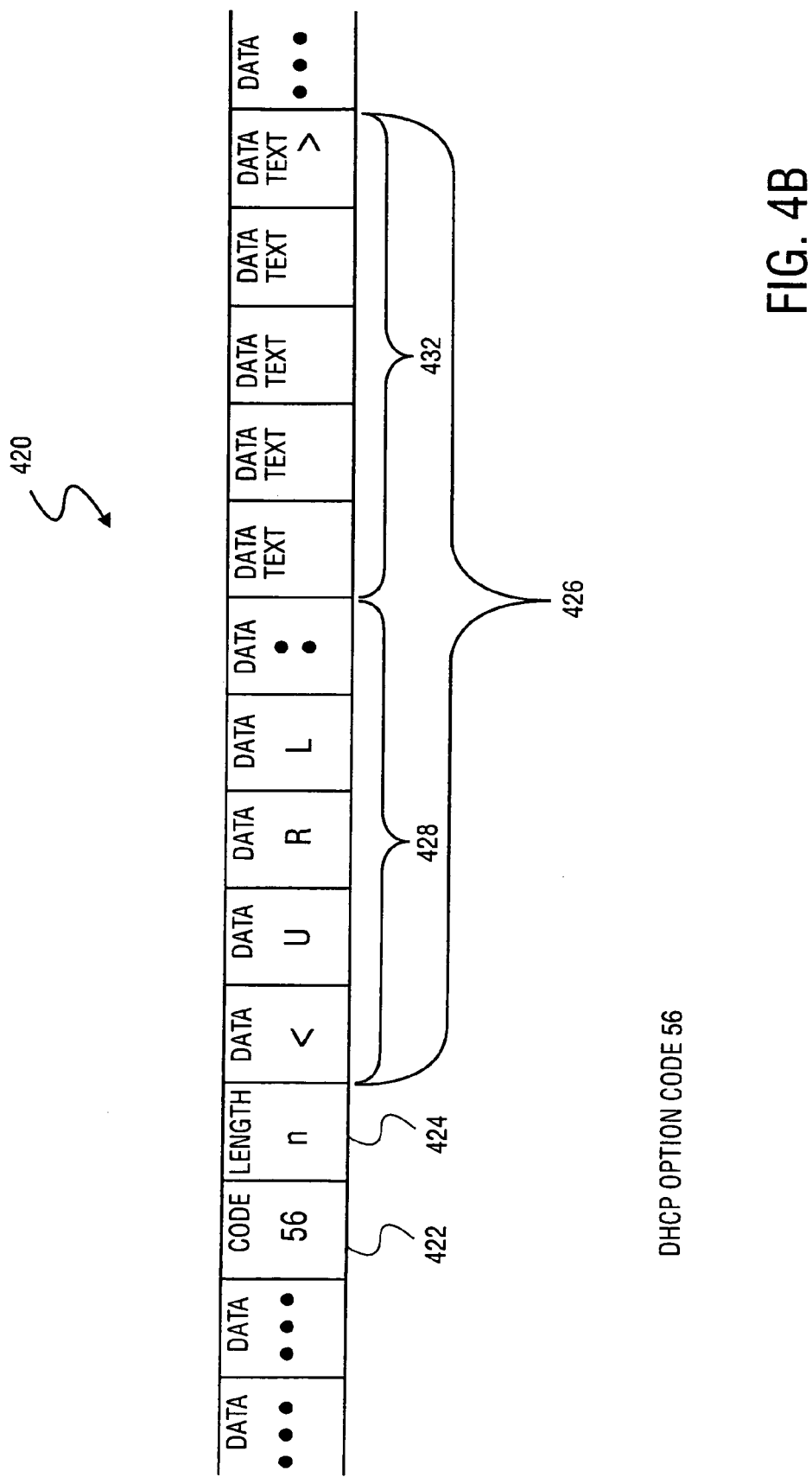
FIG. 4B depicts a DHCP packet segment using DHCP option code 56 in accordance with one embodiment of the present invention.

FIG. 4B depicts a DHCP packet segment in accordance with one embodiment of the present invention. Packet segment 420 contains a data block using option code 56. As shown in FIG. 4B, option code byte 422 is coded 56. Length byte 424 has a value of n and the following n bytes 426 contain text. Therefore, because option code 56 allows the input of a text message, the server processing system can cause the client processing system to present a text message at the time of initialization by appending an option code 56 data block to the ACKNOWLEGE packet. This is done by creating a configuration file that puts an option code 56 data block in the ACKNOWLEDGE packet that will be sent to client processing systems.

This function can be used to display any useful text upon the client processing system's network initialization. For example, a "welcome to the network" message could be displayed when a user first connects to the network and acquires a DHCP address.

In one embodiment the client processing system can also be directed to present network resources such as web pages by including a URL reference in the text message. In this case the text message would take the following form.

<URL:http://uspto.org> Welcome to the Network

The text consists of zero or more URL commands formatted so that each URL command is preceded by the text "<URL:" and followed by a single ">" character. The URL command(s) may be followed by text that is presented as-is. Referring again to FIG. 4B, the first group of data bytes 428 contain the characters "<URL:" which signifies a URL command as described above. The next group of data bytes 432 contain the text of the URL and the closing ">" character. This URL command may be followed by additional URL commands, and/or by additional non-URL text that is presented as-is.

The client processing system starts at the beginning of the text message and reads each validly formed URL command until it reaches the end of the message, or finds non-URL formatted text. Any remaining text is displayed to the user. A message containing only URL commands and no text is valid as is a message containing only text as noted above.

Any type of URL command could be used in accordance with the present invention. For example hypertext transfer protocol (http)) URL commands, AppleTalk Filing Protocol (afp) URL commands, and telnet URL commands as well as others may be implemented in an embodiment of the present invention.

In one embodiment the presentation information packet is included in the ACKNOWLEDGE packet received when the client is in the initialization/requesting state (when first connecting to the network), as described above. In alternative embodiments the client processing system may be caused to present information whenever contact is made with the server processing system. All DHCP packets are extensible so an option code 56 data block containing URL command(s) and/or a textual message could be added to server processing system messages at other times than initialization, for example during renewing a lease or rebinding.

Figure 5:
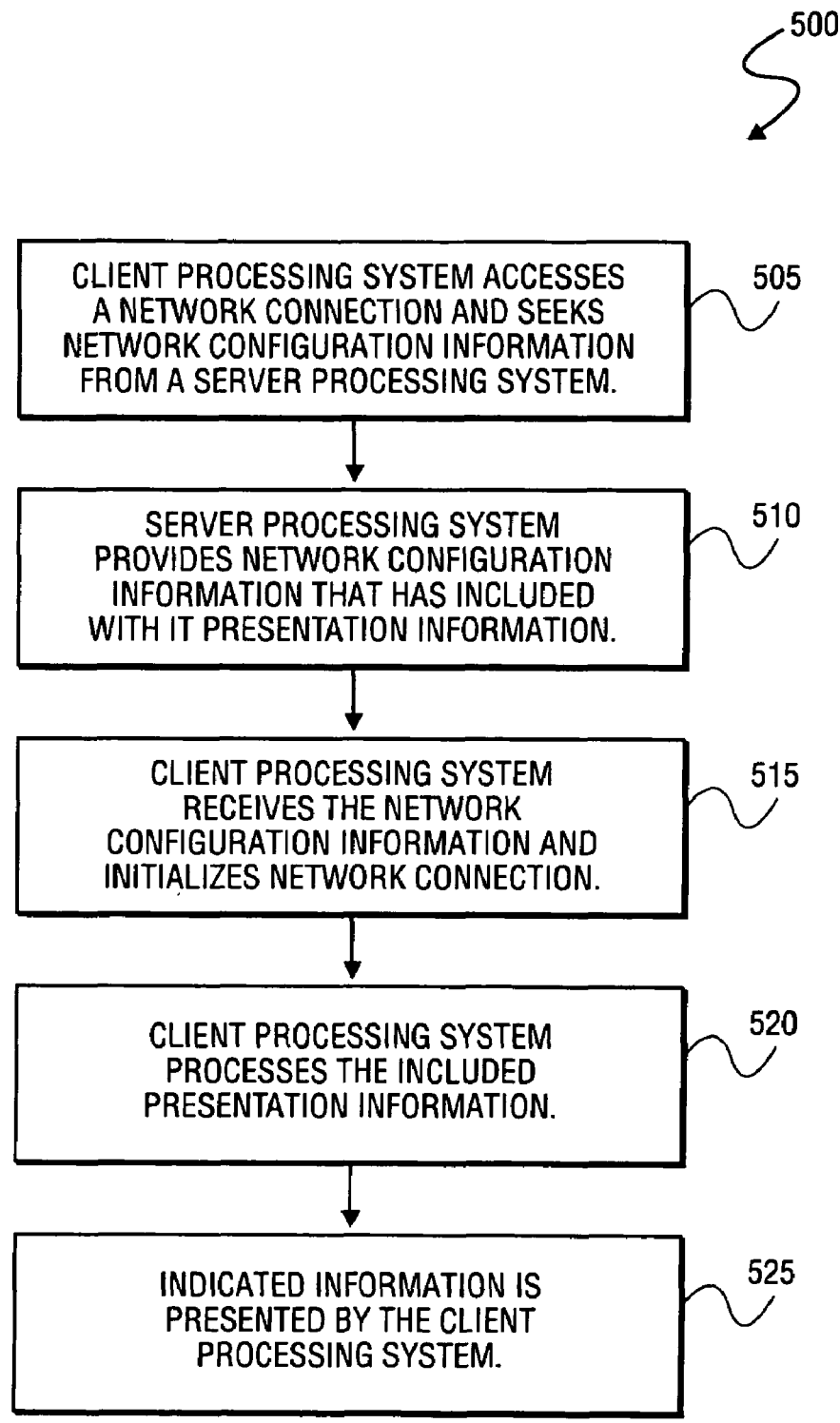
FIG. 5 is a process flow diagram in accordance with one embodiment of the present invention.

FIG. 5 is a process flow diagram in accordance with one embodiment of the present invention. Process 500, shown in FIG. 5, begins at operation 505 in which a client processing system accesses a network connection and seeks network configuration information from a server processing system as described above. This may, for example, take place in a commercial or public facility such as a restaurant, airport, or schoolroom that provides wired or wireless network access. In one case, the client processing system may be a mobile computer system (e.g., personal digital assistant (PDA) or a "smart" cell phone), that may be connected to different access points in the same local area network or different access points in different networks. The presentation information displayed after establishing the network connection may depend, in this case, upon which access point is being used (e.g., a first web page at a restaurant and a second web page at a schoolroom).

In operation 510 the server processing system provides the configuration information such as IP address, subnet mask, router address, and DNS address. Included with this information is presentation information contained in a DHCP option code 56 data block. This presentation information may include a text message or URL-formatted text that causes presentation of a web page or other network resource information. In operation 515 the client processing system receives the configuration information and initializes a network connection. The client processing system then processes the included presentation information in operation 520. The presentation information is added to the configuration information so the client processor system processes the presentation information at the time of initialization. In operation 525 the indicated information is presented, by the client processing system, upon initialization. For example, a user at a coffeehouse may be presented with a text message greeting or a web page presenting a menu or advertising. A user at an airport may receive a web page containing flight information and/or advertising for commercial establishments located at the airport. In a classroom setting a file server icon may automatically appear on the students' laptops. The information is presented automatically at the time of network initialization without action on the part of the user.

Figure 6:
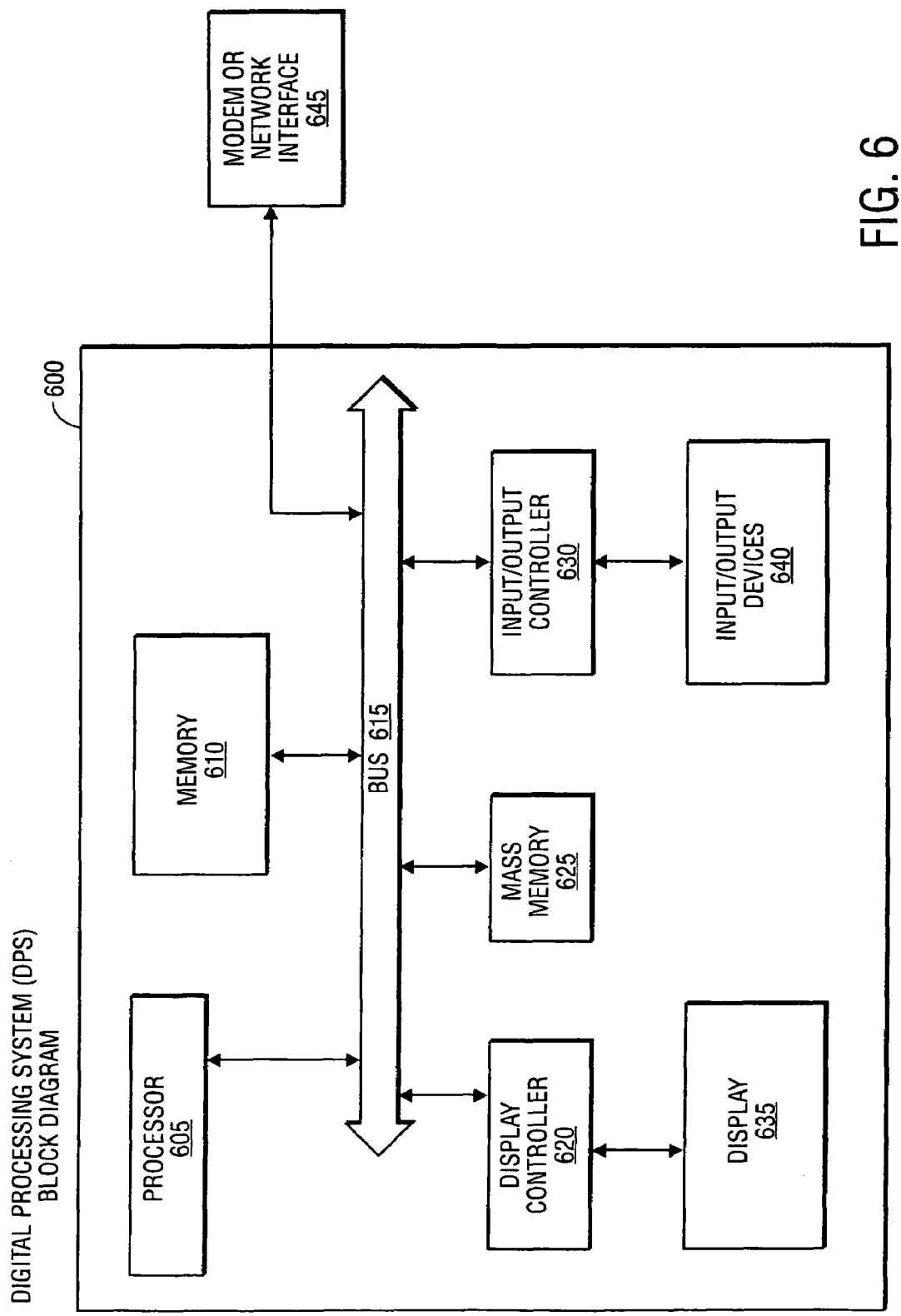
FIG. 6 is a block diagram of a processing system that may be used in accordance with one embodiment of the present invention.

FIG. 6 is a block diagram of a processing system that may be used in accordance with one embodiment of the present invention. For example, the processing system 600, shown in FIG. 6, may be used as a server processing system, or a client processing system. Furthermore, the processing system 600 may be used to perform one or more functions of an Internet service provider. The processing system 600 may be interfaced to external systems through a network interface or modem 645. The network interface or modem may be considered a part of the processing system 600. The network interface or modem may be an analog modem, an ISDN modem, a cable modem, a token ring interface, a satellite transmission interface, a wireless interface, or other interface(s) for providing a data communication link between two or more processing systems. The processing system 600 includes, a processor 605, which may represent one or more processors and may include one or more conventional types of processors, such as Motorola PowerPC processor, an Intel Pentium (or x86) processor, etc. A memory 610 is coupled to the processor 605 by a bus 615. The memory 610 may be a dynamic random access memory (DRAM) an/or may include static RAM (SRAM). The processor 605 may also be coupled to other types of storage areas/memories (e.g. cache, Flash memory, disk, etc.), that could be considered as part of the memory 610 or separate from the memory 610.

The bus 615 further couples the processor 605 to a display controller 620, a mass memory 625 (e.g. a hard disk or other storage which stores all or part of the components shown in the media diagrams of FIGS. 8, and 9 depending on the particular processing system), The network interface or modem 645, and an input/output (I/O) controller 630. The mass memory 625 may represent a magnetic, optical, magneto-optical, tape, and/or other type of machine-readable medium/device for storing information. For example, the mass memory 625 may represent a hard disk, a read-only or writable optical CD, etc. The display controller 620 controls, in a conventional manner, a display 635, which may represent a cathode ray tube (CRT) display, a liquid crystal display (LCD), a plasma display, or other type of display device. The I/O controller 630 controls I/O device(s) 640, which may include one or more keyboards, mouse/track ball or other pointing devices, magnetic and/or optical disk drives, printers, scanners, digital cameras, microphones, etc.

The processing system 600 represents only one example of a system, which may have many different configurations and architectures and which may be employed with the present invention. For example, Macintosh and Intel systems often have multiple busses, such as a peripheral bus, a dedicated cache bus, etc. On the other hand, a network computer, which may be used as a processing system of the present invention, may not include, for example, a hard disk or other mass storage device, but may receive routines and/or data from a network connection, such as the network interface or modem 645, to be processed by the processor 605. Similarly, a Web TV system, which is known in the art, may be considered to be a processing system of the present invention, but such a system may not include one or more I/O devices, such as those described above with reference to I/O device 640. Additionally, a portable communication and data processing system, which may employ a cellular telephone and/or paging capabilities, may be considered a processing system that may be used with the present invention.

In the system 600 shown in FIG. 6, the mass memory 625 (and/or the memory 610) may store data that may be processed according to the present invention. Alternatively, data may be received by the processing system 600, for example, via the network interface or modem 645, and stored and/or presented by the display 635 and/or the I/O device(s) 640. In one embodiment, data may be transmitted across a data communication network, such as a LAN and/or the Internet.

The process of the present invention may be implemented through use of a machine-readable medium that includes any mechanism that provides (i.e. stores and/or transmits) information in a form readable by a machine (e.g., a computer). For example, storage media such as: a machine-readable medium including ROM, RAM, magnetic disc storage media, optical storage media, flash memory devices and transmission media such as: electrical, optical, acoustical or other form of propagated signals (e.g., carrier waves, infrared signals, digital signals, etc.); etc.

In the foregoing specification the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative rather a restrictive sense.

I claim:

1. A method, implemented on a processing system, comprising:
    receiving a request for network configuration information from a client processing system;
    sending network configuration information from a server processing system to the client processing system using a Dynamic Host Configuration Protocol ("DHCP"), the network configuration information having added to it, at least one of presentation information, or an address representative or said presentation information formatted in accordance with the DHCP, wherein said presentation information is automatically displayed upon network initialization through the DHCP on the client processing system without any input action from a user of the client processing system, when the client processing system uses the network configuration information.

2. The method of claim 1, wherein the network configuration information is network initialization information and wherein said presentation information is determined at least in part by said network configuration information.

3. The method of claim 1, wherein the presentation information causes text to be presented.

4. The method of claim 1, wherein the address representative of the presentation information includes a URL command.

5. The method of claim 4, wherein the URL command references a web page.

6. The method of claim 5, wherein the web page contains commercial information.

7. A method, implemented on a processing system, comprising:
    requesting network configuration information from a server processing system;
    receiving network configuration information at a client processing system using a Dynamic Host Configuration Protocol ("DHCP"), the network configuration information having added to it at least one of presentation information or an address representative of said presentation information formatted in accordance with the DUCP, wherein said presentation information is automatically displayed upon network initialization through the DHCP without any input action from a user of the client processing system, when the client processing system uses the network configuration information.

8. A device comprising:
    a receiving unit to receive a request for network configuration information from a client processing system;

a sending unit to send network configuration information from a server processing system to the client processing system using a Dynamic Host Configuration Protocol ("DHCP"), the network configuration information having added to it presentation information formatted in accordance with the DHCP, wherein the presentation information is automatically displayed upon network initialization through the DHCP without any input action from a user of the client processing system, when the client processing system uses the network configuration information.

9. The device of claim 8, wherein the network configuration information is network initialization information.

10. The device of claim 8, wherein the presentation information causes text to be presented.

11. The device of claim 8, wherein the presentation information includes a URL command.

12. The device of claim 11, wherein the URL command references a web page.

13. The device of claim 12, wherein the web page contains commerical information.

14. A device comprising:
a requesting unit to request network configuration from a server processing system;
a receiving unit to receive network configuration information at a client processing system using a Dynamic Host Configuration Protocol ("DHCP"), the network configuration information having added to it presentation information formatted in accordance with the DHCP, wherein said presentation information is automatically displayed upon network initialization through the DHCP without any input action from a user of the client processing system, when the client processing system uses the network configuration information.

15. A machine readable storage medium that provides executable instructions, which when executed by a processing system, cause the processing system to perform a method, the method comprising:
receiving a request for network configuration information from a client processing system;
sending a network configuration information from a server processing system to the client processing system using a Dynamic Host Configuration Protocol ("DHCP"), the network configuration information having added to it a presentation information formatted in accordance with the DHCP wherein said presentation information is automatically displayed upon network initialization through the DHCP without any input action from a user of the client processing system, when the client processing system uses the network configuration information.

16. The machine-readable medium of claim 15, wherein the network configuration information is network initialization information.

17. The machine-readable medium of claim 15, wherein the presentation information causes text to be presented.

18. The machine-readable medium of claim 15, wherein the presentation information includes a URL command.

19. The machine-readable medium of claim 18, wherein the URL command references a web page.

20. The machine-readable medium of claim 19, wherein the web page contains commerical information.

21. A machine-readable medium, that provides executable instructions, which when executed by a processing system, cause the processing system to perform a method, the method comprising:

requesting network configuration information from a server processing system;
receiving network configuration information at a client processing system using a Dynamic Host Configuration Protocol ("DHCP"), the network configuration information having added to it presentation information formatted in accordance with the DHCP wherein said presentation information is automatically displayed upon network initialization through the DHCP without any input action from a user of the client processing system, when the client processing system uses the network configuration information.

22. The method of claim 7, further comprising:
automatically presenting said presentation information on the client processing system.

23. The method of claim 7, wherein said network initialization is not in response to a user input to access a web page.

24. The method of claim 23, wherein said network intialization is not in response to a user input instructing an application program to access a network.

25. The method of claim 7, wherein said network intialization is performed without a pending application request for network access.

26. The method of claim 22, wherein the network configuration information has been added said presentation information.

27. The method of claim 1, wherein said network initialization is not in response to a user input to access a web page.

28. The method of claim 1, wherein said network initialization is not in response to a user input instructing an application program to access network.

29. The method of claim 1, wherein said network intialization is performed without a pending application request for network access.

30. The method of claim 1, wherein the network configuration information has been added said presentation information.

31. The device of claim 14, further comprising:
a presentation unit to automatically present said presentation information on the client processing system without any input action from a user of the client processing system.

32. The device of claim 8, wherein the client processing system automatically presents said presentation information without any user input action.

33. The machine-readable medium of claim 21, wherein the method further comprises
automatically presenting said presentation information on the client processing system upon network initialization using the network configuration information without any user input action.

34. The method of claim 1, wherein the network configuration information comprises information to assign a network address to the client processing system.

35. The method of claim 7, wherein the network configuration information comprises information to assign a network address to the client processing system.

36. The device of claim 8, wherein the network configuration information assigns an Internet Protocol (IP) address to the client processing system.

37. The device of claim 14, wherein the network configuration information assigns an Internet Protocol (IP) address to the client processing system.

38. The machine-readable medium of claim 15, wherein the network configuration information is requested and sent during network address acquisition.

39. The machine-readable medium of claim 21, wherein the network configuration information is requested and sent during network address acquisition.

* * * * *